(12) United States Patent
Fenner

(10) Patent No.: US 11,365,102 B2
(45) Date of Patent: Jun. 21, 2022

(54) ADAPTER ASSEMBLY FOR LIFTING A VEHICLE

(71) Applicant: Oshkosh Corporation, Oshkosh, WI (US)

(72) Inventor: Joshua L. Fenner, Oshkosh, WI (US)

(73) Assignee: Oshkosh Corporation, Oshkosh, WI (US)

(*) Notice: Subject to any disclaimer, the term of this patent is extended or adjusted under 35 U.S.C. 154(b) by 0 days.

(21) Appl. No.: 17/407,915

(22) Filed: Aug. 20, 2021

(65) Prior Publication Data

US 2022/0041414 A1 Feb. 10, 2022

Related U.S. Application Data

(63) Continuation of application No. 17/228,228, filed on Apr. 12, 2021, which is a continuation of application No. 15/465,431, filed on Mar. 21, 2017, now Pat. No. 10,974,938.

(51) Int. Cl.
| | |
|---|---|
| *B66F 5/04* | (2006.01) |
| *B66F 3/36* | (2006.01) |
| *B66F 3/42* | (2006.01) |
| *B60P 3/12* | (2006.01) |
| *B60R 9/06* | (2006.01) |

(52) U.S. Cl.
CPC ............... *B66F 5/04* (2013.01); *B60P 3/125* (2013.01); *B66F 3/36* (2013.01); *B66F 3/42* (2013.01); *B60R 9/06* (2013.01)

(58) Field of Classification Search
CPC ...... B66F 5/04; B66F 3/36; B66F 3/42; B60P 3/125; B60R 9/06; B60B 15/26

USPC ............... 254/134; 280/402; 414/563
See application file for complete search history.

(56) References Cited

U.S. PATENT DOCUMENTS

| | | | | |
|---|---|---|---|---|
| 2,903,258 | A * | 9/1959 | Jovanovich | B25H 1/0007 248/176.1 |
| 3,858,734 | A * | 1/1975 | Holmes | B60P 3/125 294/81.5 |
| 3,915,320 | A * | 10/1975 | Curtis | B60P 3/125 414/563 |
| 4,087,008 | A * | 5/1978 | Silva, Jr. | B60P 3/127 280/448 |
| 4,557,496 | A * | 12/1985 | Sill | B60P 3/125 280/402 |
| 4,640,495 | A * | 2/1987 | Parsons | B66F 5/04 254/134 |
| 4,793,592 | A | 12/1988 | Green et al. | |
| 4,899,985 | A * | 2/1990 | Good | B66F 5/04 254/8 B |
| 5,779,225 | A | 7/1998 | Trost | |
| 5,988,974 | A | 11/1999 | Zackovich | |

(Continued)

*Primary Examiner* — Mahdi H Nejad
(74) *Attorney, Agent, or Firm* — Foley & Lardner LLP

(57) ABSTRACT

An adapter assembly for lifting a vehicle includes an adapter defining a first pin aperture, a second pin aperture, and an adapter aperture, a first pin, a second pin, and a cross member removably received by the adapter aperture. The first pin is configured to be removably received by the first pin aperture and a first aperture defined by a frame of the vehicle to selectively couple the adapter to the frame. The second pin is configured to be removably received by the second pin aperture and a second aperture defined by the frame of the vehicle to selectively couple the adapter to the frame.

8 Claims, 10 Drawing Sheets

(56) References Cited

U.S. PATENT DOCUMENTS

| | | |
|---|---|---|
| 9,493,921 B2 | 11/2016 | Amin et al. |
| 9,637,362 B2 * | 5/2017 | Zhang ................... B66F 5/02 |
| 10,974,938 B2 | 4/2021 | Fenner |
| 2008/0112781 A1 | 5/2008 | Schrafel |
| 2010/0102284 A1 | 4/2010 | Drake |
| 2013/0228729 A1 * | 9/2013 | Elliott .................... B66F 3/44 |
| | | 254/2 C |
| 2014/0084228 A1 | 3/2014 | Hart |
| 2014/0259476 A1 | 9/2014 | Amin et al. |
| 2017/0051462 A1 | 2/2017 | Amin et al. |
| 2018/0111589 A1 * | 4/2018 | Burger ................... B66F 3/16 |
| 2018/0273361 A1 * | 9/2018 | Fenner ................... B66F 3/36 |
| 2019/0292029 A1 * | 9/2019 | Moore .................... B66F 3/36 |
| 2021/0229968 A1 * | 7/2021 | Fenner ................... B66F 5/04 |

\* cited by examiner

ADAPTER ASSEMBLY FOR LIFTING A VEHICLE

CROSS-REFERENCE TO RELATED PATENT APPLICATIONS

This application is a continuation of U.S. patent application Ser. No. 17/228,228, filed Apr. 12, 2021, which is a continuation of U.S. patent application Ser. No. 15/465,431, filed on Mar. 21, 2017, now U.S. Pat. No. 10,974,938, all of which are incorporated herein by reference in their entireties.

BACKGROUND

Lift devices are commonly used when performing maintenance on a vehicle. Lift devices provide increased access to the underside of a vehicle by elevating the vehicle further from the ground to provide increased ground clearance. This increased ground clearance facilitates certain maintenance procedures that might otherwise prove difficult. Lift devices may additionally be used to support the vehicle when the tractive elements of the vehicle (e.g., wheels), normally in contact with the ground, are removed. Examples of lift devices include jacks, such as manual scissor jacks carried in automobiles for changing a tire alongside the road, and jack stands that maintain the elevation of the vehicle once it has been lifted.

SUMMARY

One embodiment of the invention relates to an adapter assembly for lifting a vehicle. The adapter assembly includes an adapter defining a first pin aperture, a second pin aperture, and an adapter aperture, a first pin, a second pin, and a cross member removably received by the adapter aperture. The first pin is configured to be removably received by the first pin aperture and a first aperture defined by a frame of the vehicle to selectively couple the adapter to the frame. The second pin is configured to be removably received by the second pin aperture and a second aperture defined by the frame of the vehicle to selectively couple the adapter to the frame.

Another embodiment of the invention relates to an adapter for lifting a vehicle. The adapter defines (a) a first pin aperture configured to removably receive a first pin to selectively couple the adapter to a frame of the vehicle, (b) a second pin aperture configured to removably receive a second pin to selectively couple the adapter to the frame of the vehicle, and (c) an adapter aperture configured to removably receive a cross member. The adapter aperture has a circular cross section.

Still another embodiment of the invention relates to a method for lifting a vehicle. The method includes providing an adapter defining an adapter aperture, a first pin aperture, and a second pin aperture. The method further includes inserting a first pin through (a) the first pin aperture of the adapter and (b) a first aperture defined by a frame of the vehicle and inserting a second pin through (a) the second pin aperture of the adapter and (b) a second aperture defined by the frame to couple the adapter to the frame. The method further includes inserting a cross member at least partially through the adapter aperture and applying a lifting force to the vehicle through the cross member and the adapter such that the vehicle is moved from a lowered position to an elevated position.

The invention is capable of other embodiments and of being carried out in various ways. Alternative exemplary embodiments relate to other features and combinations of features as may be recited in the claims.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
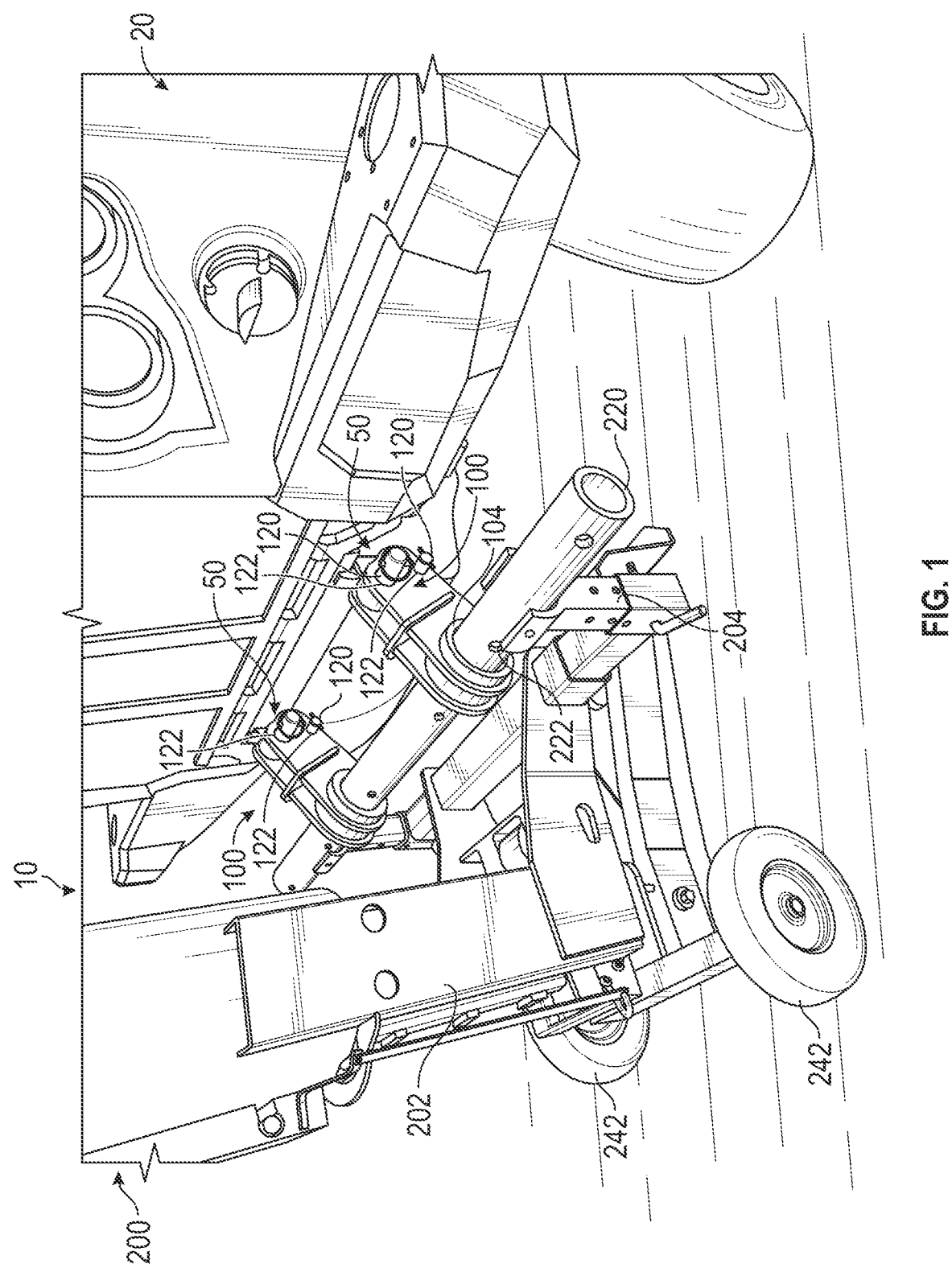
FIG. 1 is a perspective view of a vehicle lift assembly elevating a vehicle, according to an exemplary embodiment.
Figure 2:
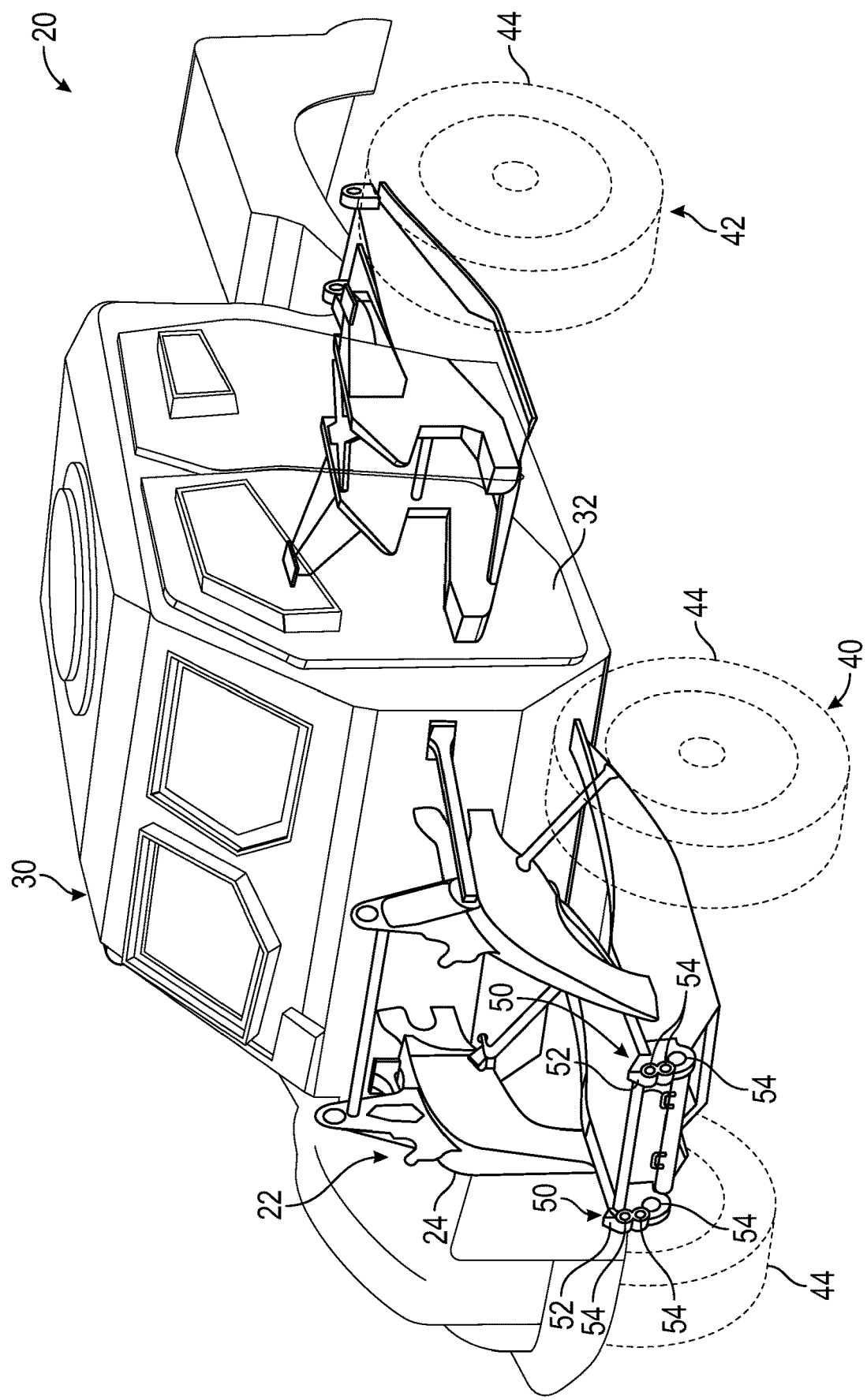
FIG. 2 is a perspective view of the vehicle of FIG. 1, according to an exemplary embodiment.

Referring to FIG. 1, an assembly, shown as lift assembly 10, may be used to elevate a vehicle, shown as vehicle 20, from a lowered position to an elevated position. One exemplary embodiment of vehicle 20 is shown in FIG. 2. The vehicle 20 includes a chassis 22 which further includes a frame 24 that supports a body assembly including a cabin 30. The frame 24 of the vehicle 20 engages a plurality of tractive assemblies, shown as front tractive assemblies 40 and rear tractive assemblies 42. In some embodiments, the vehicle 20 includes a plurality of front tractive assemblies 40 and/or a plurality of rear tractive assemblies 42 (e.g., one, two, etc.). The front tractive assemblies 40 and/or the rear tractive assemblies 42 may include brakes (e.g., disc brakes, drum brakes, air brakes, etc.), gear reductions, steering components, wheel hubs, wheels, tires, and/or other features. As shown in FIG. 2, the front tractive assemblies 40 and the rear tractive assemblies 42 each include tractive elements, shown as wheel and tire assemblies 44. In other embodiments, at least one of the front tractive assemblies 40 and the rear tractive assemblies 42 include a different type of tractive element (e.g., a track, etc.). According to an exemplary embodiment, the cabin 30 includes one or more doors, shown as doors 32, that facilitate entering and exiting an interior of the cabin 30. The interior of the cabin 30 may include a plurality of seats (e.g., two, three, four, five, etc.), vehicle controls, driving components (e.g., steering wheel, accelerator pedal, brake pedal, etc.), etc.

According to an exemplary embodiment, the vehicle 20 includes a powertrain system. The powertrain system may include a primary driver (e.g., an engine, a motor, etc.), an energy generation device (e.g., a generator, etc.), and/or an energy storage device (e.g., a battery, capacitors, ultracapacitors, etc.) electrically coupled to the energy generation device. The primary driver may receive fuel (e.g., gasoline, diesel, etc.) from a fuel tank and combust the fuel to generate mechanical energy. A transmission may receive the mechanical energy and provide an output to the generator. The generator may be configured to convert mechanical energy into electrical energy that may be stored by the energy storage device. The energy storage device may provide electrical energy to a motive driver to power at least one of the front tractive assemblies 40 and the rear tractive assemblies 42. In some embodiments, each of the front tractive assemblies 40 and/or the rear tractive assemblies 42 include an individual motive driver (e.g., a motor that is electrically coupled to the energy storage device, etc.) configured to facilitate independently driving each of the wheel and tire assemblies 44. In some embodiments, a transmission of the vehicle 20 is rotationally coupled to the primary driver, a transfer case assembly, and one or more drive shafts. The one or more drive shafts may be received by one or more differentials configured to convey the rotational energy of the drive shaft to a final drive (e.g., half-shafts coupled to the wheel and tire assemblies 44, etc.). The final drive may then propel or move the vehicle 20. In such embodiments, the vehicle 20 may not include the generator and/or the energy storage device. The powertrain of the vehicle 20 may thereby be a hybrid powertrain or a non-hybrid powertrain. According to an exemplary embodiment, the primary driver is a compression-ignition internal combustion engine that utilizes diesel fuel. In alternative embodiments, the primary driver is another type of device (e.g., spark-ignition engine, fuel cell, electric motor, etc.) that is otherwise powered (e.g., with gasoline, compressed natural gas, hydrogen, electricity, etc.).

In some embodiments, the vehicle 20 is an off-road vehicle such as a utility task vehicle, a recreational off-highway vehicle, an all-terrain vehicle, a sport utility vehicle, and/or still another vehicle. In other embodiments, the vehicle 20 is another type of off-road vehicle such as mining, construction, and/or farming equipment. In still other embodiments, the vehicle 20 is an aerial truck, a rescue truck, an aircraft rescue and firefighting (ARFF) truck, a concrete mixer truck, a refuse truck, a commercial truck, a tanker, an ambulance, and/or still another vehicle. As shown in FIG. 2, the vehicle 20 is a military ground vehicle. The chassis 22 may be monocoque, and the frame 24 may not include frame rails. The omission of frame rails may increase the overall blast resistance of the vehicle 20.

Referring again to FIG. 2, the frame 24 includes a pair of tow points 50 disposed at the front of the vehicle 20. Throughout a normal operation of the vehicle 20, the tow points 50 may be used to couple the vehicle 20 to another object. By way of example, the tow points 50 may be attached to another vehicle (e.g., using cables or chains, etc.) to facilitate towing of the other vehicle by the vehicle 20. As shown, the tow points 50 are equally spaced laterally from a longitudinal centerline of the vehicle 20. In other embodiments, the frame 24 may include more or fewer tow points 50 located at or near the front of the vehicle. By way of example, the frame 24 may include one tow point 50 located along the longitudinal centerline of the vehicle 20. In some embodiments, the vehicle 20 includes additional or alternative tow points 50 at or near the rear of the vehicle 20.

Referring to FIG. 2, the tow points 50 are shown to include a body 52 defining a number of tow apertures 54, shown as tow eyes or tie down eyes, passing laterally through the body 52. The tow apertures 54 may facilitate attaching chain, rope, cable, bolts, straps, etc. to the vehicle 20. During normal operation of the vehicle 20, the tow apertures 54 may be used when towing another object, such as a vehicle, trailer, or obstruction (e.g., a fallen tree, etc.) and/or to facilitate towing vehicle 20 (e.g., with another vehicle). The tow apertures 54 may facilitate attaching the vehicle 20 to a surface such that movement between the vehicle 20 and the surface is prevented. By way of example, straps may be run through the tow eyes and coupled to a bed of another vehicle, such as a rail car or trailer bed, during transport of the vehicle 20. In some embodiments, one or more of the tow apertures 54 are omitted from the tow points 50. Although the tow apertures 54 are shown to have specific diameters, it should be understood that the sizes of the apertures may be varied depending on the intended use of the vehicle 20.

Figure 3:
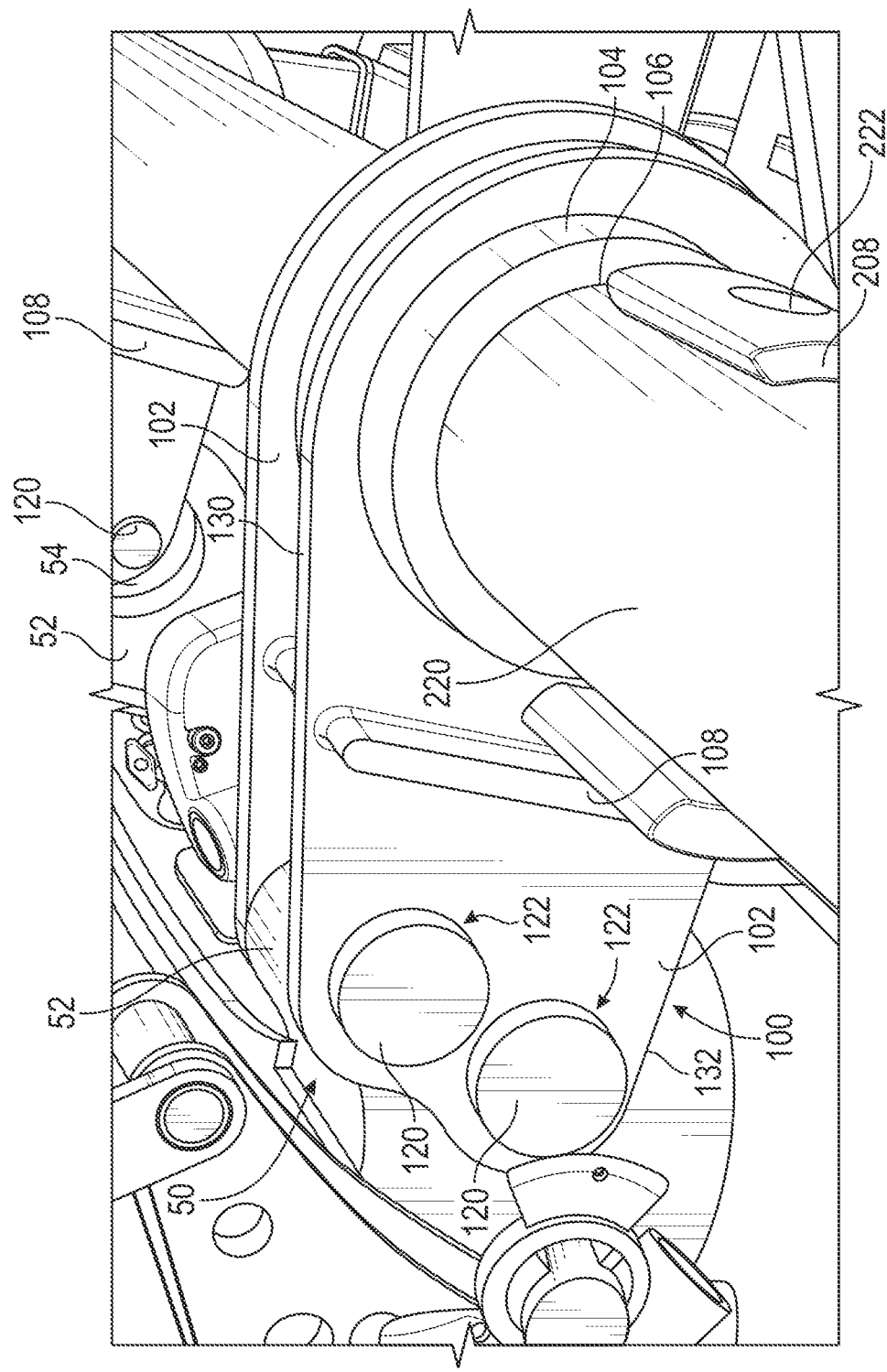
FIG. 3 is a perspective view of an adapter of the vehicle lift assembly of FIG. 1, according to an exemplary embodiment.

As shown in FIGS. 1 and 3, the lift assembly 10 includes a pair of adapter assemblies, shown as adapters 100. The adapters 100 include a pair of plates 102. The pair of plates 102 are spaced an offset distance apart from each other. A ring, shown as adapter ring 104, extends through both plates 102 and defines an adapter aperture 106. The adapter ring 104 is coupled (e.g., by welding, by a threaded connection, etc.) to both plates 102. The adapters 100 further include reinforcement plates 108 extend laterally between the two plates 102. As shown in FIGS. 1 and 3, the reinforcement plate 108 extends through both plates 102 and is coupled to both plates 102 (e.g., by welding, by a bolted connection, etc.). The reinforcement plate 108 provides additional rigidity to the structure of the adapter 100. In some embodiments, the reinforcement plate 108 is omitted. In some embodiments, the adapter ring 104 does not fully enclose the adapter aperture 106. By way of example, a bottom portion of the adapter ring 104 and the plates 102 may be open such that the adapter aperture 106 is exposed from a bottom of the adapter 100. The opening may facilitate inserting the cross member 220 into the adapter aperture 106 from a bottom side of the adapter 100 (e.g., by lifting the cross member 220 into the adapter aperture 106 with the lift device 200).

A set of pins 120 pass through apertures 122 in each plate 102. The pins 120 pass through the tow apertures 54 of a corresponding tow point 50, coupling the adapter 100 to the tow point 50. When using the lift assembly 10 to lift the vehicle 20, a lifting force is applied to the adapter 100 through the adapter ring 104, and the pins 120 transfer the lifting force to the vehicle 20. Although the pins 120 are shown as round pins with a formed head on one end that are pinned on the opposite end, the pins 120 may be another removable member capable of transferring a lifting force through the adapter 100 into the tow point 50 (e.g., a bolt, a hexagonal pin, etc.). In some embodiments, the pins 120 are removable without the use of tools. In some embodiments, the pins 120 are sized to be a similar diameter to the tow apertures 54 (e.g., to reduce "slop" in the connection and prevent movement of the adapter 100 relative to the tow point 50, etc.). In other embodiments, as shown in FIG. 3, one or more of the tow apertures 54 has a larger diameter than the pins 120.

The pins 120 prevent rotation of the adapter 100 relative to its corresponding tow point 50 and may assist with alignment of the adapter aperture 106. In some embodiments, the pins 120 are spaced different distances away from the adapter ring 104. By way of example, an upper edge 130 of the plate 102 may be shorter than a lower edge 132 of the plate 102 to accommodate a shorter distance between the upper pin 120 and the adapter ring 104 than between the lower pin 120 and the adapter ring 104, such as shown in FIG. 3. Adapter 100 with a distance between the upper pin 120 and the adapter ring 104 shorter moves the adapter aperture 106 upwards relative to the ground when attached to the tow point 50. The pins 120 may be otherwise located to adjust the position of the adapter aperture 106. In other embodiments, the adapter 100 includes one pin 120. By way of example, the vehicle 20 may only include one tow aperture 54 in each tow point 50. In some such embodiments, the adapter 100 is prevented from rotating while lifting the vehicle 20 by contact between a component of the adapter 100 and an outer surface of the body 52. By way of example, the reinforcement plate 108 may be located within the adapter 100 such that it contacts an outer surface of the body 52, preventing rotation. In other such embodiments, the adapter 100 couples to the tow point 50 using only one pin, and the adapter 100 can freely rotate. This method of coupling the adapter 100 to the tow point 50 may be employed in embodiments where the tow points 50 are the frontmost part of the vehicle 20, such that the adapters 100 may rotate upwards during a lifting operation without contacting another portion of the vehicle 20.

Figure 4:
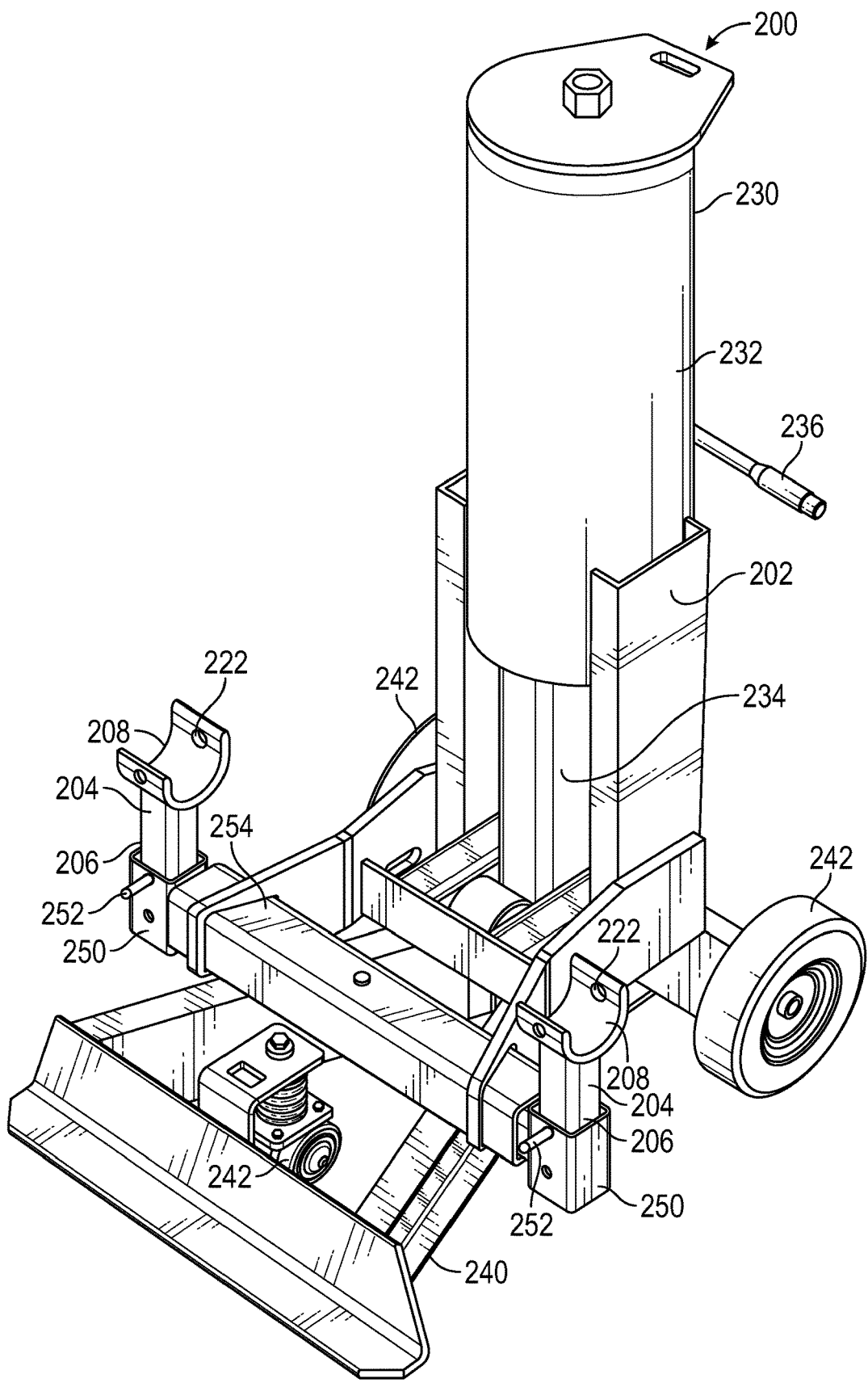
FIG. 4 is a perspective view of a lift device of the vehicle assembly of FIG. 1, according to an exemplary embodiment.

As shown in FIGS. 1 and 4, the lift assembly 10 includes a lift device 200 configured to interface with the adapters 100 and direct a lifting force through the adapters 100 to lift the vehicle 20 (e.g., from a lowered position to an elevated position, etc.). In the lowered position, the tires of the vehicle 20 may contact a ground surface therebelow, and in the elevated position, the tires of the vehicle 20 may be lifted from the ground surface. The lift device 200 includes a lift base 202 coupled to a pair of receivers 204. The receivers include a member, shown as tubular member 206, coupled (e.g., welded, bolted, etc.) to a cradle 208. A cross member 220 (e.g., of an adapter assembly, etc.) is configured to be received by the cradle 208 of each receiver 204 as shown in FIG. 1. When engaged with the receivers 204, the cross member 220 extends laterally across the lift device 200. When lifting, the cradles 208 apply a vertical lifting force to the cross member 220. In the embodiment shown in FIGS. 1 and 3, the cradles 208 only partially enclose the cross member 220 (e.g., engage a bottom or lower underside of the cross member 220, etc.). Cradles 208 facilitate setting the cross member 220 into the cradles 208 from above the receivers 204 and facilitates lifting the cross member 220 vertically from the receivers 204. In another embodiment, the cradles 208 enclose a greater portion of the cross member 220, the enclosing portion of the cradles 208 inhibiting movement from the receivers 204 from above. In both such embodiments, cross member 220 can be slid into the cradles 208 from the side of the lift device 200. The cross member 220 and the cradles 208 may define corresponding apertures 222 through which a pin (e.g., a bolt, a cotter pin, etc.) may be positioned to prevent relative movement (e.g., lateral translation, vertical translation, rotation, etc.) between the cross member 220 and the receivers 204.

Referring to FIGS. 1 and 3, the cross member 220 passes through both of the adapter apertures 106. The adapter rings 104 and cross member 220 may be sized relative to one another to facilitate the cross member 220 passing freely through the adapter apertures 106. When in place in the adapters 100, the cross member 220 extends laterally relative to the vehicle 20. As shown in FIGS. 1 and 3, the cross member 220, the cradles 208, and the adapter rings 104 are all circular, facilitating rotation of the components relative to one another (e.g., for alignment purposes, etc.). In other embodiments, such components may have a different cross sectional shape (e.g., square, triangular, etc.) that prevents rotation.

Referring to FIG. 4, a lifting force is applied to the lift base 202 by a hydraulic cylinder 230 including a tube, shown as cylinder body 232, and a rod, shown as cylinder rod 234. The body 232 is included as part of (e.g., integrally formed with, coupled to, etc.) the lift base 202. The cylinder 230 may further include a manipulator, shown as handle 236, configured to facilitate controlling the movement of the hydraulic cylinder 230. By way of example, the handle 236 may be coupled to the appropriate valving that facilitates lifting base 202 by pumping the handle 236 and lower the lift base 202 by turning the handle 236. The rod 234 is coupled to a cart 240 that supports the lift base 202 and, when lifting, the weight of the vehicle 20. The cart 240 may include one or more wheels 242 configured to facilitate transport and manipulation (e.g., turning, translating, etc.) of the lift device 200. The relative positions of the lift base 202 and the receivers 204 may be adjustable. As shown in FIG. 4, the receivers 204 are received by and slidably coupled to vertical tubes 250 and secured with pins 252. The vertical tubes 250 and the tubular member 206 may include multiple sets of holes through which the pin 252 may be positioned to allow for vertical adjustment of the receivers 204. As shown in FIG. 4, the vertical tubes 250 are received by and slidably coupled to a horizontal tube 254. Such an arrangement facilitates lateral adjustment of the receivers 204. The horizontal tube 254 may be pinned similarly to the vertical tubes to selectively fix the vertical tubes 250 relative to the horizontal tube 254.

When lifting, the lift device 200 provides a lifting force through the receivers 204, through the cross member 220, through the adapters 100, and into the tow points 50, lifting the vehicle 20. In a lowered position, shown in FIG. 1, the weight of the vehicle is fully supported by a component of the vehicle 20 (e.g., the wheel and tire assemblies 44) and/or at least a portion of the vehicle is disposed along a ground surface (e.g., such as the rim of the wheel and tire assemblies 44 should a flat tire condition occur, etc.). In an elevated position, a portion of the weight of the vehicle 20 (e.g., 10% of the weight, 100% of the weight, etc.) is supported by the lift assembly 10. The systems of the present Application facilitates selectively lifting the vehicle 20 to a variable height depending on a number of factors, including the preference of the operator. In the elevated position, a portion of the vehicle 20 may still contact the ground. The lift device 200 may be used to controllably move the vehicle 20 between the lowered position and the elevated position.

Figure 5:
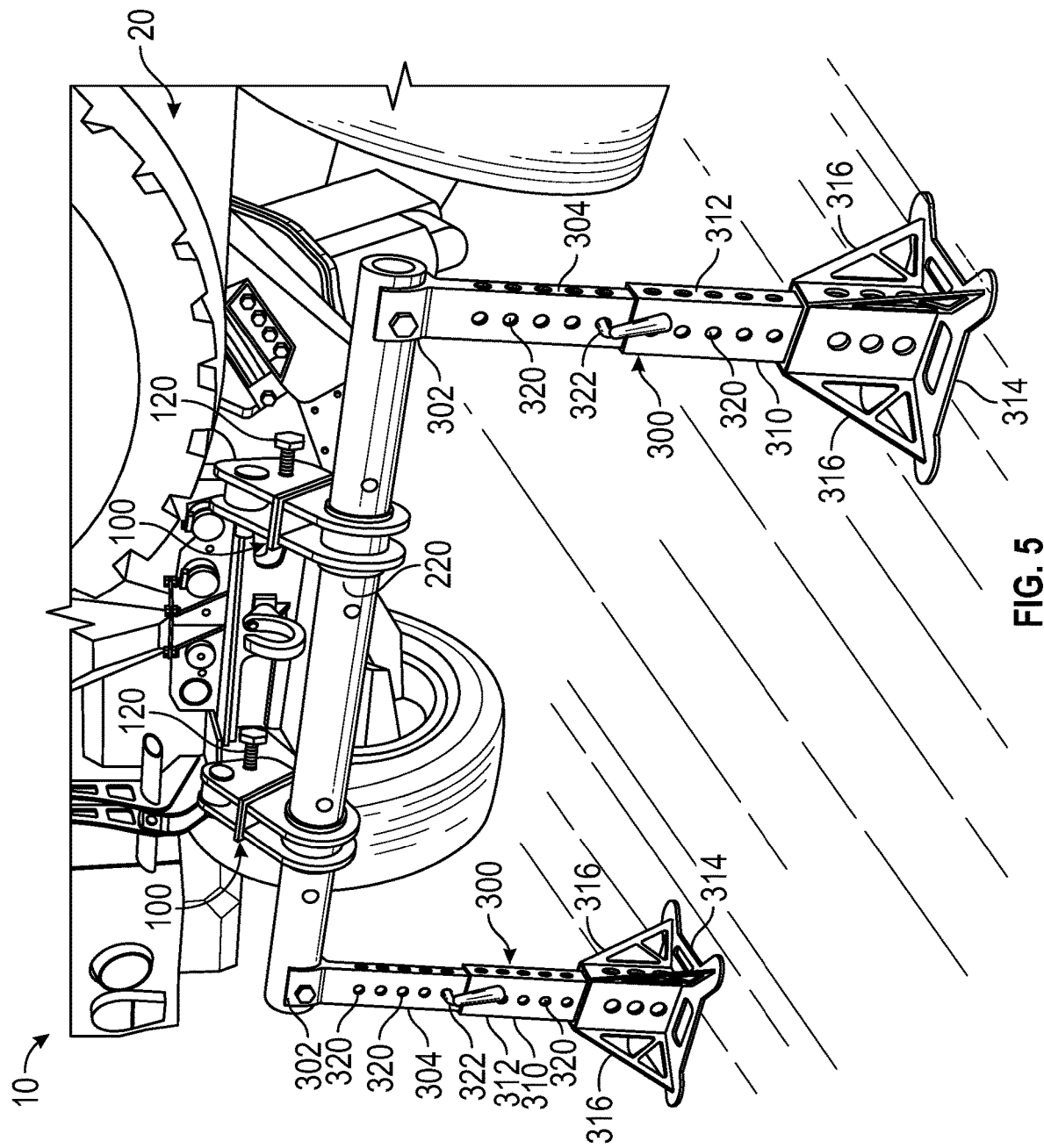
FIG. 5 is a perspective view of the vehicle lift assembly of FIG. 1 including a pair of stands, according to an exemplary embodiment.

Referring to FIG. 5, the lift assembly 10 further includes a pair of stands, shown as front stands 300. In one embodiment, the front stands 300 are configured to support the vehicle 20 in an elevated position. The stands 300 may be placed directly below the cross member 220 and be configured to direct the weight of the vehicle 20 into the ground. The stands 300 each include an interface 302 coupled to a member, shown as tubular stand member 304, and a base 310. The interface 302 may be shaped similarly to the cradle 208, and the interface 302 and the cross member 220 may include corresponding apertures similar in function and construction to apertures 222. The base 310 includes a vertical tubular portion 312. A base plate 314 is coupled to a bottom portion of the tubular portion 312, and a number of ribs 316 extend between the base plate 314 and the tubular portion 312. The base plate 314 is larger than the tubular portion 312 and facilitates distributing the weight of the vehicle 20 across the ground surface. The size of the base plate 314 additionally increases the stability of the stand 300. The ribs 316 add structural rigidity to the base 310. The stand member 304 is received by and slidably coupled to the tubular portion 312 of the base 310. The tubular portion 312 and the stand member 304 each define a plurality of holding apertures 320 configured to align with one another when the stand member 304 is extended predefined distances from the tubular portion 312. A pin 322 may be extended through the holding apertures 320 of both the tubular portion 312 and the stand member 304 such that the stands 300 support the cross member 220 at various predefined heights. In some embodiments, the pin 322 is extended through the holding apertures 320 of either the tubular portion 312 or the stand member 304 and contacts an end of the other to support the cross member 220 at other heights. The lengths of the tubular portion 312 and the stand member 304 may be changed to support the vehicle 20 at various height ranges. In some embodiments, the stands 300 include multiple sets of tubular portions 312 and/or stand members 304 with various lengths that can be interchanged.

Referring again to FIG. 5, the stands 300 may be used in conjunction with the lift device 200 to support the vehicle 20. The lift device 200 may be used to lift the vehicle 20 into an elevated position. Once the vehicle 20 is elevated, the stands 300 may be placed underneath the cross member 220 such that the interfaces 302 are aligned and engageable with the cross member 220. The lift base 202 may be lowered, such that the cross member 220 lowers onto (and directly contacts) the stands 300. The lift base 202 may then be lowered further until the receivers 204 no longer contact the cross member 220. The lift device 200 may then be removed (e.g., by sliding away from the vehicle 20, etc.) while the stands 300 support the vehicle 20 in an elevated position. In some embodiments, the cross member 220 is of a sufficient length that the lift device 200 and the stands 300 contact the cross member 220 simultaneously. In such embodiments, the stands 300 may be spaced a greater distance apart from one another than the distance separating the two receivers 204.

Figure 6:
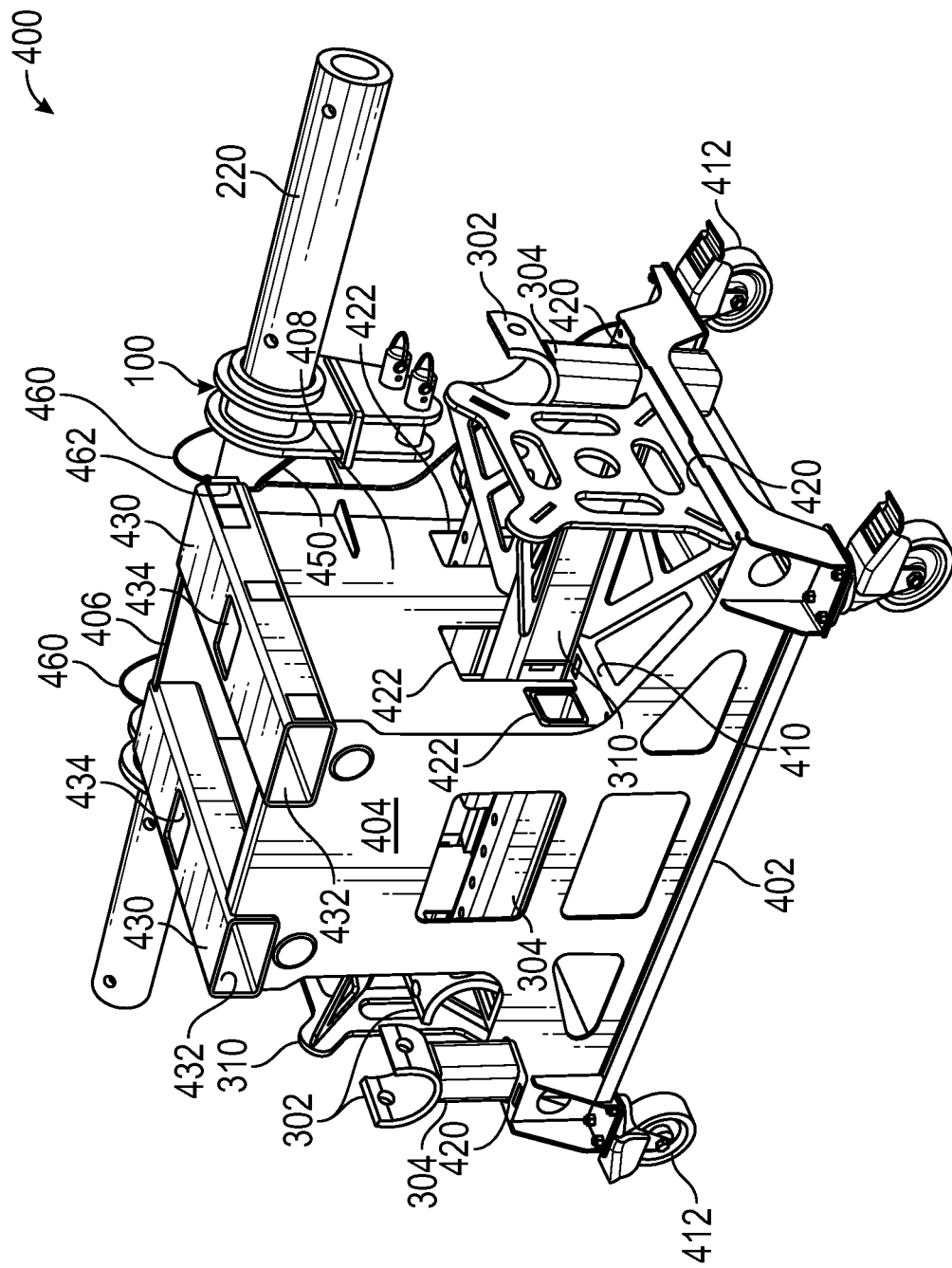
FIG. 6 is a perspective view of a storage cart of the vehicle lift assembly of FIG. 1, according to an exemplary embodiment.

Referring to FIG. 6, the lift assembly 10 includes a cart, shown as storage cart 400, that is configured to store various other components of the lift assembly 10. The cart 400 includes a base 402 including a front wall 404, a rear wall 406, a pair of side walls 408, and a floor 410 shown as formed from sheet metal and coupled (e.g., welded, etc.) to one another. The base 402 may include one or more wheels 412 to facilitate transport and manipulation of the cart 400. The base 402 is configured to store the stands 300. The base 402 may include various pockets 420 and apertures 422 to accommodate storage of the stand 300. As shown in FIG. 6, the interface 302 and stand member 304 are separated from the base 310 and stored in the base 402. The floor 410 includes pockets 420 that receive the interface 302, the stand member 304, and the base 310. The side walls 408 include apertures to accommodate insertion of the stand member 304 and the base 310. As shown, the stands 300 include two sets of interfaces 302 coupled to stand members 304 of different lengths. A pair of fork tubes 430 are coupled to the front wall 404 and the rear wall 406. The fork tubes 430 define a fork aperture 432 and a crane aperture 434. The fork apertures 432 facilitate entrance of a pair of utility forks (e.g., driven by another vehicle a fork truck or fork lift, etc.) into the fork tubes 430. The other vehicle may then apply a lifting force on the base 402 to lift the cart (e.g., onto a shelf, onto a truck, for transport, etc.). The crane apertures 434 act as an interface between a hook driven by a vehicle (e.g., a boom truck, a mobile crane, a standing crane, etc.). The other vehicle may then apply a lifting force on the base 402 to lift the cart 400. In other embodiments, the base 402 is otherwise lifted.

Figure 7:
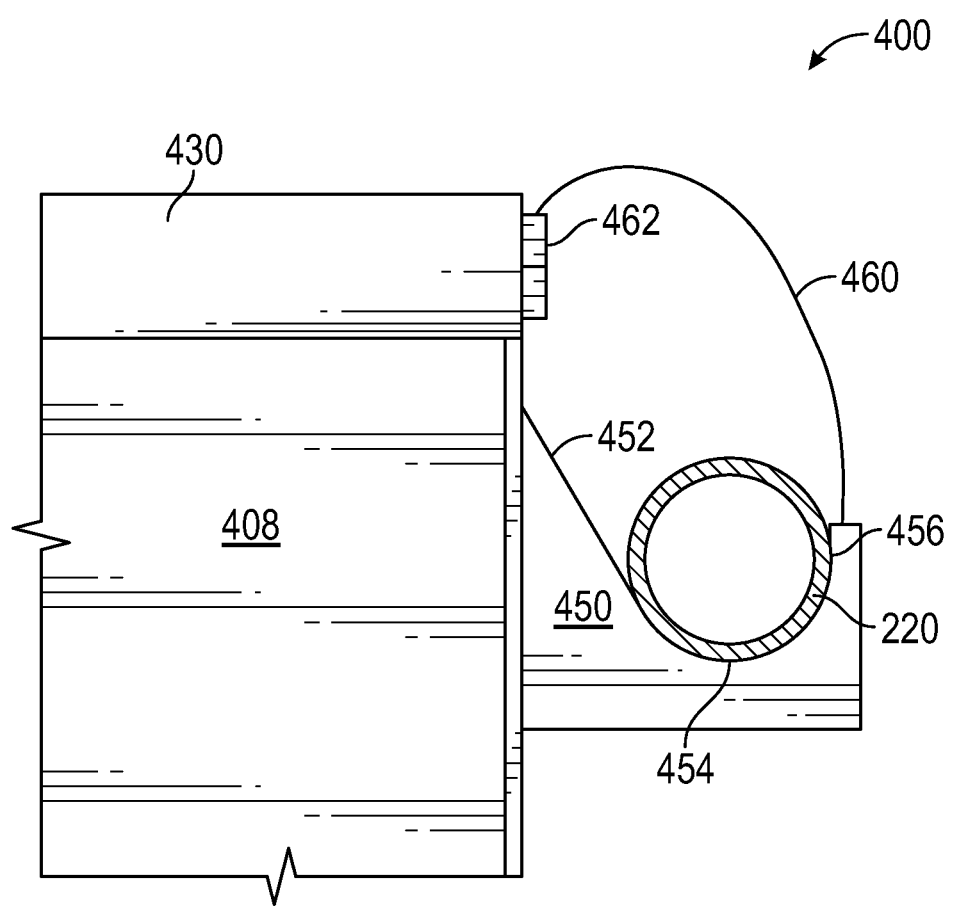
FIG. 7 is a section view of the storage cart of FIG. 6, according to an exemplary embodiment.

Referring to FIGS. 6 and 7, the base 402 includes a pair of receivers 450 configured to receive the cross member 220. The receivers 450 extend rearward from the rear wall 406 as shown in FIG. 6. The receiver 450 defines an angled portion 452, a cradle portion 454, and a rear portion 456. When aligning the cross member 220 with the receivers 450, the angled portions 452 contact the cross member 220 and draw it into the cradle portion 454 where the cross member 220 is received to compensate for any initial misalignment. The cradle portion 454 hold the cross member 220 in place with the adapters 100 attached. As shown, the rear portion 456 continues the curvature of the cradle portion 454. In other embodiments, the rear portion 456 is angled opposite the angled portion 452 to further compensate for misalignment. In some embodiments, the cart 400 includes a cable 460 coupled to both the receiver 450 and a coupler 462. The coupler 462 selectively couples (e.g., using a removable pin, etc.) the cable 460 to the fork tube 430. Such coupling encloses the cross member 220 between the cable 460, the receiver 450, and the base 402, preventing unintended dislodgement of the cross member 220. When applying a lifting force through the crane apertures 434, the base 402 may pivot about the crane apertures 434, and the cable 460 and the rear portion 456 may prevent unintended dislodgement of the cross member 220.

Figure 8:
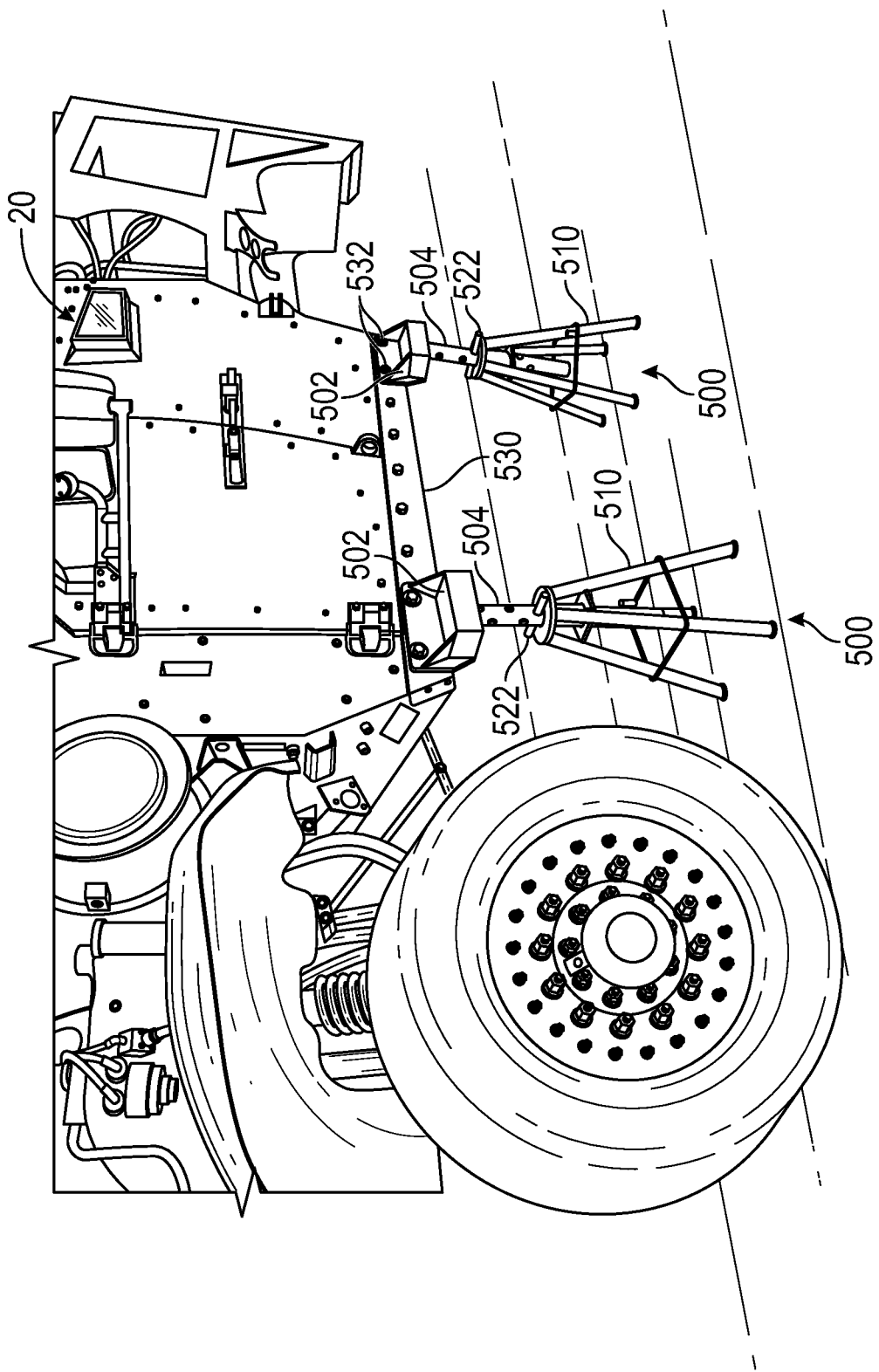
FIG. 8 is a perspective view of the vehicle lift assembly of FIG. 1 including a pair of side stands, according to an exemplary embodiment.

As shown in FIG. 8, the lift assembly 10 includes a pair of stands, shown as side stands 500, configured to support the vehicle 20. The side stands include an interface 502 coupled to a tubular stand member 504, a base 510 slidably coupled to the tubular stand member 504, and a pin 522. The tubular stand member 504, the base 510, and the pin 522 may function similarly to corresponding components of the stand 300. The side stands 500 may be stored in the cart 400 similarly to the stands 300. As shown in FIG. 8, the interface 502 is configured to be coupled to a side of the vehicle 20 (e.g., the front side, the back side, the left side, the right side, etc.). The frame 24 of the vehicle 20 is shown to include a panel 530 that is fastened to the frame 24 with a number of fasteners 532. The interface 502 is configured to receive the fasteners 532 and support the vehicle 20 by applying a lifting force through the fasteners 532. The side stands 500 may be used alone or in conjunction with the stands 300.

Figure 9:
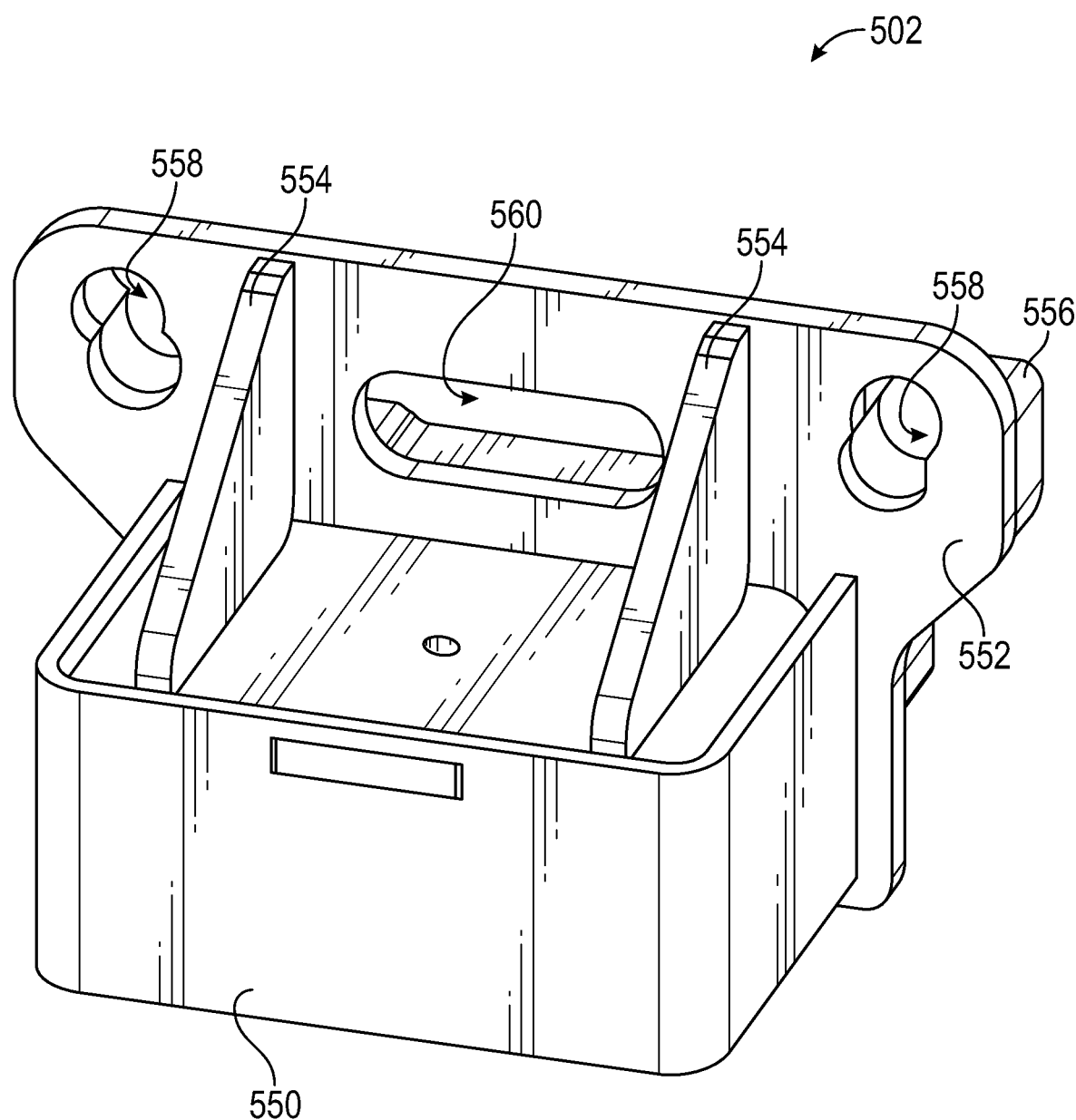
FIG. 9 is a perspective view of an interface of the side stands of FIG. 8, according to an exemplary embodiment.

Referring to FIG. 9, the interface 502 includes a member 550 coupled to a plate 552, a pair of ribs 554 coupled to the member 550 and the plate 552, and a support plate 556 coupled to the plate 552 opposite the member 550. The member 550 may include an aperture to receive stand member 504. In some embodiments, the member 550 and the stand member 504 are coupled (e.g., with a threaded connection, etc.). A pair of apertures 558 are defined in the plate 552 and the support plate 556. These apertures 558 receive the fasteners 532. As shown in FIG. 9, the apertures 558 include two overlapping circular cutouts. The overlapping circular cutouts are positioned such that the interface 502 may accommodate different spacing distances of the fasteners 532 (e.g., for different vehicles, etc.). The support plate 556 increases the area of the interface 502 that supports the fasteners 532 to prevent deformation of the apertures 558. The ribs 554 provide additional rigidity to the interface 502. A slot 560 extends laterally across the interface 502 and may facilitate grasping of the interface 502 by an operator.

Figure 10:
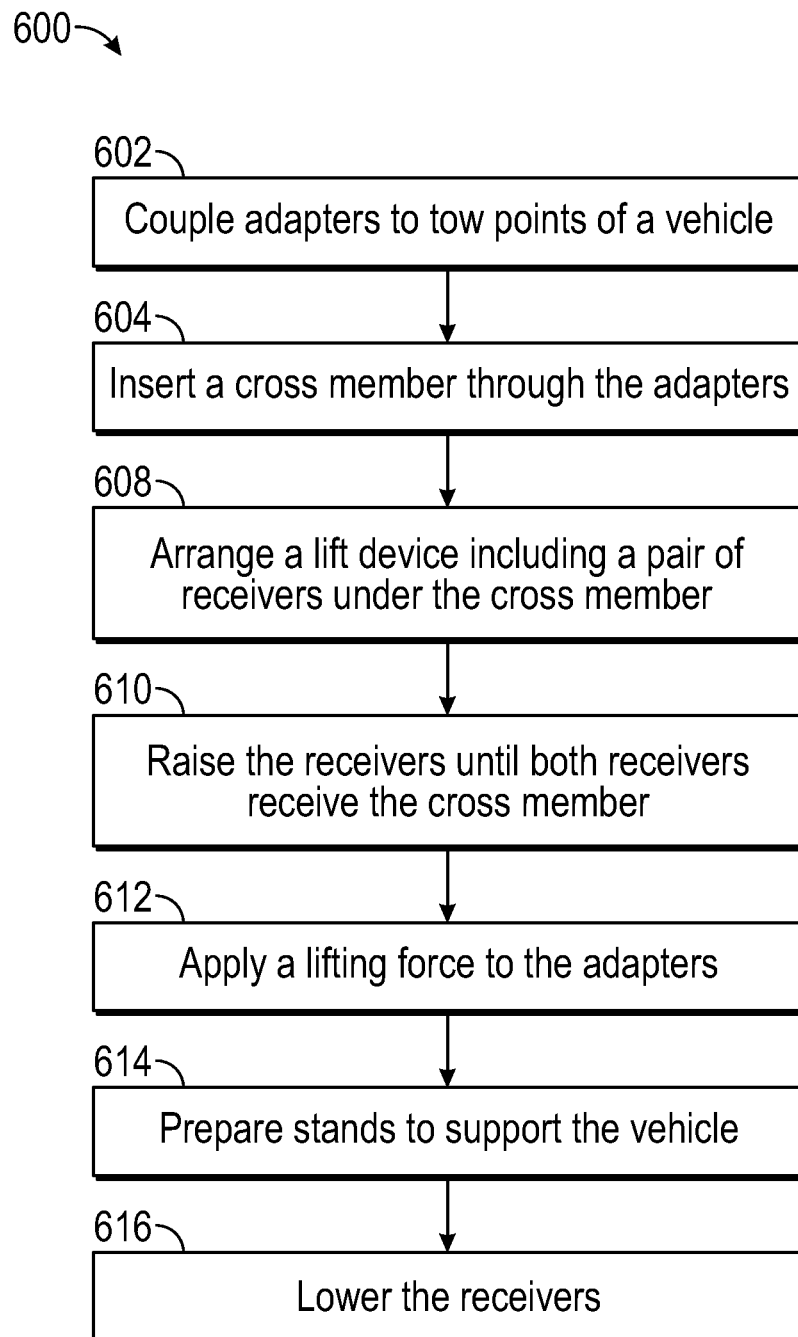
FIG. 10 is a flowchart of a method of lifting a vehicle, according to an exemplary embodiment.

Referring to FIG. 10, a method 600 of lifting a vehicle is shown, according to an exemplary embodiments. In some embodiments, method 600 is used with one or more of the vehicle 20, the adapters 100, the lift device 200, the stands 300, and the side stands 500. In other embodiments, the method 600 is used with other components. In step 602, the adapters 100 are coupled to the tow points 50 of the vehicle. The adapters 100 may be coupled to the tow apertures 54 using the pins 120 as discussed above. In step 604, the cross member 220 is inserted through both of the adapter apertures 106. In some embodiments, the cross member 220 extends only partially through each adapter 100. In step 606, the lift device 200 is arranged underneath the cross member 220 such that the receivers 204 are aligned with the cross member 220. In one embodiment, the receivers 204 are aligned with the cross member 220 when the receivers can be raised vertically and come into contact with the cross member 220 as shown in FIG. 1. In some embodiments, a small amount of misalignment is accommodated by the systems and methods disclosed herein. In step 610, the receivers 204 are raised until both receivers 204 receive the cross member 220 as shown in FIG. 1 (e.g., by pumping the hydraulic cylinder 230). In some embodiments, fasteners are positioned through the apertures 222 to secure the cross member 220 to the receivers 204. In step 612, a lifting force is applied through the receivers 204, the cross member 220, and the adapters 100 to the tow points 50 to lift the vehicle 20. In some embodiments, the receivers 204 are lifted by applying a force to the lift base (e.g., by pumping the hydraulic cylinder 230).

In some embodiments, the vehicle 20 is lifted to an elevated position by the lift device 200. In such embodiments, method 600 may not include steps 614 and 616. In other embodiments, the vehicle 20 is held in an elevated position by the stands (e.g., the stands 300, the side stands 500, etc.). In step 614, the stands are prepared to support the vehicle 20. When using the stands 300, the stands 300 are placed underneath the cross member 220, and the interfaces 302 are aligned similarly to the receivers in step 608. The stands 300 may be spaced apart a sufficient distance to facilitate removal of the lift device. When using the side stands 500, the fasteners 532 are removed from the panel 530, threaded through the apertures 558 in the interface 502, and reattached to the panel 530. In step 616, the receivers are lowered, and the stands fully support the vehicle 20 in the elevated position. In some embodiments, the bolts coupling the receivers 204 to the cross member 220 are first removed. In some embodiments, the cross member 220 is bolted to the interface 302. The lift device may then be used to lift the other end (e.g., the rear end, the front end) of the vehicle 20. In some embodiments, the lift device is removed to facilitate unobstructed access to the underside of the vehicle 20. To lower the vehicle 20, a reverse of the method 600 may be followed.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

The construction and arrangements of the vehicle, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions and arrangement of the various exemplary embodiments without departing from the scope of the present invention.

The invention claimed is:
1. An adapter assembly for lifting a vehicle, the adapter assembly comprising:
 a first adapter defining a first pin aperture, a second pin aperture, and a first adapter aperture extending substantially parallel to one another;

a second adapter configured to be selectively coupled to a frame of the vehicle, the second adapter defining a third pin aperture and a fourth pin aperture;

a first pin configured to be removably received by the first pin aperture and a first aperture defined by the frame of the vehicle to selectively couple the first adapter to the frame;

a second pin configured to be removably received by the second pin aperture and a second aperture defined by the frame of the vehicle to selectively couple the first adapter to the frame;

a third pin configured to be removably received by the third pin aperture and a third aperture defined by the frame to selectively couple the second adapter to the frame; and a fourth pin configured to be removably received by the fourth pin aperture and a fourth aperture defined by the frame to selectively couple the second adapter to the frame; and a cross member removably received by the first adapter aperture and a second adapter aperture defined by the second adapter such that the first adapter aperture and the second adapter aperture are aligned.

2. The adapter assembly of claim 1, wherein the cross member is configured to engage a lift device, and wherein the cross member, the first adapter, and the second adapter are configured to transfer a lifting force from the lift device to the frame to lift the vehicle.

3. The adapter assembly of claim 1, wherein an exterior surface of the cross member that is received by the first adapter aperture has a circular cross section.

4. The adapter assembly of claim 3, wherein the first adapter aperture has a circular cross section.

5. The adapter assembly of claim 1, wherein the cross member is rotatable relative to the first adapter when the cross member is received within the first adapter aperture.

6. The adapter assembly of claim 1, wherein the first adapter includes a pair of plates spaced apart from one another to form a recess therebetween that is configured to receive a portion of the frame that defines the first aperture and the second aperture.

7. The adapter assembly of claim 6, wherein the first pin aperture and the second pin aperture are aligned with the recess such that the first pin and the second pin extend into the recess when (a) the first pin is received by the first pin aperture and the first aperture defined by the frame and (b) the second pin is received by the second pin aperture and the second aperture defined by the frame.

8. The adapter assembly of claim 6, wherein the first adapter includes a tubular member coupled to the pair of plates and defining the first adapter aperture.

* * * * *